United States Patent
Box et al.

(10) Patent No.: US 9,368,048 B2
(45) Date of Patent: Jun. 14, 2016

(54) DISPLAY DEVICE AND METHOD OF MANUFACTURE

(76) Inventors: Benoit Box, L'isle Adam (FR); Fabrice Henon, Cergy (FR); Andre Mendiboure, Reuil Malmaison (FR); Bernard Guillet, Nois-le-Grand (FR)

(*) Notice: Subject to any disclaimer, the term of this patent is extended or adjusted under 35 U.S.C. 154(b) by 41 days.

(21) Appl. No.: 14/114,504

(22) PCT Filed: Apr. 12, 2012

(86) PCT No.: PCT/EP2012/001580
§ 371 (c)(1),
(2), (4) Date: Jan. 30, 2014

(87) PCT Pub. No.: WO2012/149995
PCT Pub. Date: Nov. 8, 2012

(65) Prior Publication Data
US 2014/0168570 A1    Jun. 19, 2014

(30) Foreign Application Priority Data

Apr. 30, 2011  (DE) .......................... 10 2011 100 139
Oct. 31, 2011  (FR) ...................................... 11 03311

(51) Int. Cl.
*G02F 1/1335*   (2006.01)
*G09F 13/14*   (2006.01)
*G09F 13/04*   (2006.01)
(Continued)

(52) U.S. Cl.
CPC ............. *G09F 13/14* (2013.01); *G02F 1/1336* (2013.01); *G09F 13/0409* (2013.01); *G09F 13/16* (2013.01); *G09F 21/04* (2013.01); *G09F 21/045* (2013.01); *Y10T 29/49002* (2015.01)

(58) Field of Classification Search
None
See application file for complete search history.

(56) References Cited

U.S. PATENT DOCUMENTS

| 3,973,342 A * | 8/1976 | Gubela ................... G09F 13/16 40/208 |
| 6,070,549 A | 6/2000 | Iuchi et al. |
| 6,198,516 B1 * | 3/2001 | Kim et al. ....................... 349/39 |

(Continued)

FOREIGN PATENT DOCUMENTS

| CN | 2567607 Y | 8/2003 |
| CN | 1603905 A | 4/2005 |

(Continued)

OTHER PUBLICATIONS

International Preliminary Report on Patentability for PCT Application No. PCT/EP2012/001580 dated Nov. 14, 2013; 6 pages.

(Continued)

*Primary Examiner* — Ryan Crockett
(74) *Attorney, Agent, or Firm* — Fletcher Yoder, P.C.

(57) ABSTRACT

The invention relates to a display device, to a backlighting element, and to a method of manufacturing a backlighting element and a display device, the display device comprising a display element, the display element being backlit using a light source, a backlighting element being provided to backlight the display element, the backlighting element comprising a light guide part providing the light guide functionality, the backlighting element comprising a reflective element part, the light guide part of the backlighting element and the reflective element part being functionally combined with one another, the reflective element part and the light guide part of the backlighting element being joined, during the manufacture of the backlighting element, to form a single component.

5 Claims, 1 Drawing Sheet

(51) Int. Cl.
*G09F 13/16* (2006.01)
*G09F 21/04* (2006.01)

(56) References Cited

U.S. PATENT DOCUMENTS

| | | | |
|---|---|---|---|
| 6,685,328 B1 * | 2/2004 | Hanson | G02B 6/0028 349/58 |
| 6,835,440 B1 * | 12/2004 | Konishi et al. | 428/156 |
| 2004/0194653 A1 * | 10/2004 | Taffinder | B60R 13/10 101/483 |
| 2005/0152157 A1 * | 7/2005 | Nomura | 362/609 |
| 2007/0081111 A1 * | 4/2007 | Chang et al. | 349/62 |
| 2007/0146571 A1 * | 6/2007 | Nakagawa et al. | 349/58 |
| 2008/0055882 A1 | 3/2008 | Ueno et al. | |
| 2009/0080208 A1 | 3/2009 | Droste et al. | |
| 2010/0283936 A1 * | 11/2010 | Ji et al. | 349/58 |
| 2011/0310325 A1 | 12/2011 | Cuvillier | |

FOREIGN PATENT DOCUMENTS

| | | |
|---|---|---|
| CN | 100529519 C | 8/2009 |
| EP | 0 777 108 A1 | 6/1997 |
| EP | 2 028 046 A1 | 2/2009 |
| KR | 10 2004 0059605 A | 7/2004 |
| KR | 1020040059605 | 7/2004 |
| TW | M286382 U | 1/2006 |

OTHER PUBLICATIONS

International Search Report for application No. PCT/EP2012/001580 mailed Jun. 19, 2012.

Chinese Office Action and Search Report dated Jul. 30, 2015.

* cited by examiner

DISPLAY DEVICE AND METHOD OF MANUFACTURE

CROSS REFERENCE TO RELATED APPLICATIONS

This application claims priority from and the benefit of PCT Application No. PCT/EP2012/001580, filed on Apr. 12, 2012; German Patent No. DE 10 2011 100 139.9, filed on Apr. 30, 2011; and French Patent FR 11/03311, filed on Oct. 31, 2011; all entitled "Display Device and Method of Manufacture", which are herein incorporated by reference.

BACKGROUND

The present invention relates to a display device, particularly for a motor vehicle, a backlighting element for a display device, a method of manufacture for manufacturing one such reflective element, and a method for manufacturing a display device.

Display devices are known, for example in the Korean patent application no. KR 10 2004 0059605 A. This publication proposes to provide a display device with backlighting. Moreover, a display device is also known from the American publication U.S. Pat. No. 6,179,429 B1.

A drawback of a device according to the prior art consists in the need to provide a relatively complicated and, consequently, relatively expensive assembly. Another drawback of such a device according to the prior art consists in the duration of the assembly which increases as a function of the number of complementary parts to assemble.

SUMMARY

The present invention especially has the aim of palliating the drawbacks of the prior art, and particularly those mentioned above, and also has the aim of proposing a display device that enables simple and very effective assembly of such a device.

According to the invention, this aim is achieved by a display device comprising a display element, the display element being backlit using a light source, a backlighting element being provided to ensure the backlighting of the display element, the backlighting element comprising a light guide part providing the light guide functionality,
  the backlighting element comprising a reflective element part,
  the light guide part of the backlighting element and the reflective element part being functionally combined with each other,
  the reflective element part and the light guide part of the backlighting element being joined, during the manufacture of the backlighting element, to form a single part.

With such a display device comprising the backlighting element in a single part, it is advantageously possible to assemble the display device in a simple and effective way. The assembly process of the display device is especially simplified because only the backlighting element has to be considered to produce the backlighting function. Previously, it was necessary to assemble the light guide, a reflective element, and, furthermore, an element serving as a casing.

According to a preferred embodiment according to the present invention, the reflective element part is provided in the form of a non-transparent film, and the light guide part is formed in an injection molding step with the reflective element part present in the molding tool.

The advantage of making the reflective element part in the form of a non-transparent film lies in the fact that it is thus possible to make the backlighting element in its light guide part by injection molding in such a way as to keep the reflective element part present in the molding tool. This way of joining two elements in an injection molding step is also called "inmold" or "overmold".

A preferred improvement of the invention lies in the fact that the reflective element part is provided in the form of a non-transparent film applied to a surface of the light guide part of the backlighting element.

By producing the display device in this way it is advantageously possible to join the light guide part with the reflective element part especially by depositing a film of ink (providing the reflective function) on the light guide part of the backlighting element.

In another preferred embodiment according to the present invention, the backlighting element comprises a casing element part providing the functionality of encasing the display device and/or the backlighting element.

By producing the display device in this way it is advantageously possible to avoid using an additional element in the assembly of the display device, since the backlighting element contributes the functionalities not only of light guide and reflective element, but also of casing.

Yet another preferred improvement according to the present invention also lies in the fact that the backlighting element comprises a means for optically filtering and/or a means for scattering light.

By such a production method, it is advantageously possible to produce the backlighting element in such a way that it is suitable for a generalized application to various display devices, particularly from various suppliers.

According to yet another preferred embodiment, the display element is a liquid crystal display (LCD), especially comprising thin film transistors (TFTs).

The present invention also relates to a backlighting element for use in a display device according to the present invention.

Moreover, the present invention also relates to a method for manufacturing a backlighting element to provide the backlighting of a display element, the backlighting element comprising a light guide part providing the light guide functionality,
  the backlighting element comprising a reflective element part,
  the light guide part of the backlighting element and the reflective element part being functionally combined with each other,
  the method for manufacturing the backlighting element comprising a step of joining the reflective element part and the light guide part of the backlighting element to form a single part.

Another preferred improvement of the invention lies in the fact that the reflective element part is provided in the form of a non-transparent film, and that the step of joining the reflective element part and the light guide part of the backlighting element comprises the injection molding of the light guide part with the reflective element part present in the molding tool.

Another preferred improvement of the invention lies in the fact that the reflective element part is provided in the form of a non-transparent film applied to a surface of the light guide part of the backlighting element, and that the step of joining the reflective element part and the light guide part of the backlighting element comprises the application of the non-transparent film to a surface of the light guide part of the backlighting element.

Other features and advantages of the invention will become apparent on reading the following description of a particular nonlimiting embodiment of the invention.

DRAWINGS

The invention will be better understood thanks to the description hereinafter, which concerns preferred embodiments, given by way of nonlimiting examples, and explained with reference to the appended schematic drawings, in which:

FIGS. 1 and 2 are schematic views of a display device according to the prior art, FIG. 3 is a schematic cross-sectional view of the backlighting element, which forms part of the display device in a first embodiment according to the present invention, and FIG. 4 is a schematic cross-sectional view of the backlighting element, which forms part of the display device in a second embodiment according to the present invention.

DETAILED DESCRIPTION

In FIGS. 1 and 2, a display device 10 according to the prior art is shown comprising means for producing backlighting. According to the prior art, the backlighting is normally produced using at least three different elements which are to be considered in the assembly of the display device 10: the display element 20, the light guide 3, and a casing element 4. A light source 6 is positioned in the casing element 4. Using the light from this light source 6, the display element 20 is backlit, especially to increase the contrast of the display element 20. To guide the light, and also to spread (or distribute) more uniformly the intensity of the light emitted from the light source 6, provision is made for using the light guide 3. Moreover, provision may be made for using a filter to match or modify the color of the light perceptible by a user of the display device.

In a display device 10 according to the present invention, provision is made for a backlighting element which acts as an integral backlighting element. This is shown in FIGS. 3 and 4.

Figure 1:
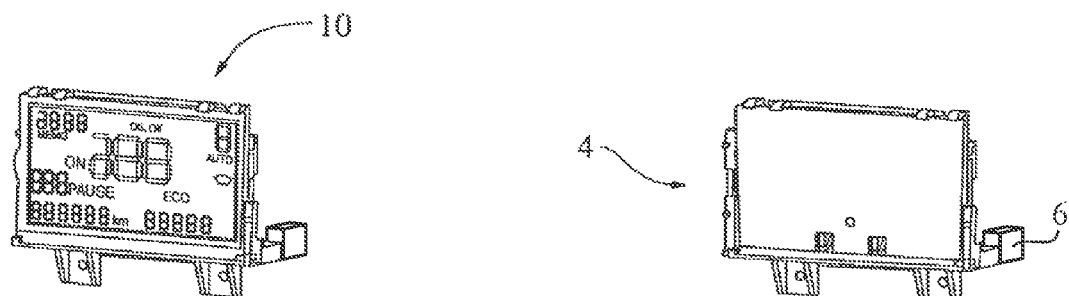
Figure 2:
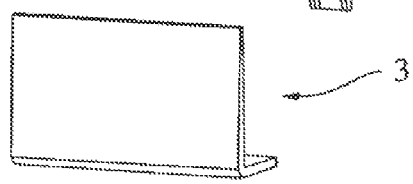
Figure 2:
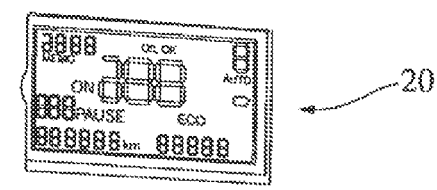
Figure 3:
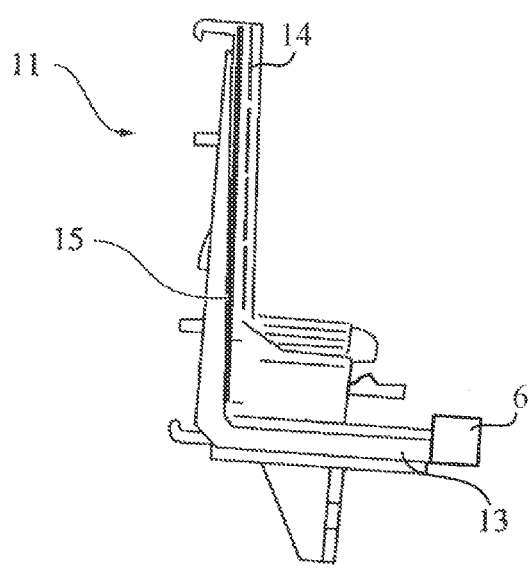
FIG. 3 shows a schematic cross-sectional view of the backlighting element 11, in a first embodiment according to the present invention, which is part of the display device 10.
Figure 4:
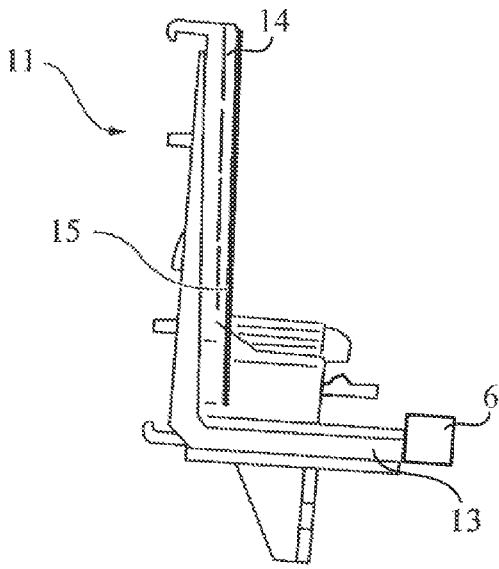
FIG. 4 shows a schematic cross-sectional view of the backlighting element 11, in a second embodiment according to the present invention, which is part of the display device 10.

As shown by FIGS. 3 and 4 of the appended drawings, the display device 10 according to the present invention comprises the backlighting element 11, which is made as a single part, and which provides at least the functionalities of light guide (in a light guide 13 part of the backlighting element 11), and of reflective element (in a reflective element 15 part of the backlighting element 11).

Moreover, provision may also be made for the backlighting element 11 to also provide (i.e. in addition to the abovementioned functionalities) the functionality of casing element, particularly in a casing element 14 part of the backlighting elements 11.

The display device 10 comprises a display element 20, especially a liquid crystal display (LCD), and especially one comprising thin film transistors (TFTs).

According to the present invention, the display device 10 comprises a light source 6, which is especially produced by a light-emitting diode (LED) or a plurality of light-emitting diodes (LED). In the context of the present invention, a plurality of light-emitting diodes is also referred to as light source elements.

The light guide 13 part of the backlighting element 11 has the particular aim of distributing the light emitted by the light source 6 as uniformly as possible over the display surface.

According to the present invention, the light source 6 or the light source elements are connected by way of a printed flex circuit.

In the two embodiments according to the present invention, the backlighting element 11 is provided in a single part which makes the method for manufacturing the device easier to assemble and more effective. The backlighting element 11 is produced, at least where its light guide 13 part is concerned, of a transparent material, at least where the light from the light source 6 of the display device 10 is concerned. Provision is especially made for the backlighting element 11 to be made of a plastic material, especially PMMA (polymethyl methacrylate).

PMMA (polymethyl methacrylate) is a transparent thermoplastic the monomer of which is methyl methacrylate (MMA). PMMA may be molded by compression molding, injection molding, casting, blow molding, or extrusion.)

Provision is especially made for the backlighting element 11 to be completely made of a PMMA (polymethyl methacrylate) material or for the light guide 13 part of the backlighting element 11 to be made of a PMMA (polymethyl methacrylate) material, and for the casing element 14 part to be made of a non-transparent material, for example of ABS (acrylonitrile butadiene styrene).

The backlighting element 11 is especially formed by an injection molding step. In this step of manufacturing the backlighting element 11, provision is made, in a first embodiment according to the present invention (shown in FIG. 3) for the reflective element 15 part of the backlighting element 11 to be joined to the light guide 13 part by injection molding with the reflective element 15 present in the molding tool of the backlighting element 11. This process is called "in-mold" or "over-mold".

In the second embodiment of the backlighting element 11 according to the present invention (shown in FIG. 4), a non-transparent film, especially a film of one color, and especially a film of ink, is applied or deposited on a surface of the light guide 13 part of the backlighting element 11 after the backlighting element 11 has been formed, especially using an injection molding step.

The invention claimed is:

1. A display device, comprising
   a display element comprising a liquid crystal display, wherein the liquid crystal display comprises thin film transistors; and
   a backlighting element comprising a transparent thermoplastic, wherein the transparent thermoplastic comprises polymethyl methacrylate, the backlighting element is configured to backlight the display element, and the backlighting element comprising:
   a light guide;
   a casing element; and
   a reflective element comprising a non-transparent film, wherein the reflective element is disposed between the light guide and the casing element, or coupled to the casing element, such that the casing element is configured to reflect light emitted by the light guide in a direction of the display element;
   wherein the backlighting element is formed by an injection molding step comprising in-molding or over-molding the light guide from polymethyl methacrylate with the reflective element present in a molding tool, and wherein the in-molding or over-molding comprises compression molding, injection molding, casting, blow molding, or extrusion of the polymethyl methacrylate to produce the backlighting element;

wherein the light guide and the casing element of the backlighting element are formed from the polymethyl methacrylate; and wherein the light guide, the casing element, and the reflective element form a single integral part.

2. The display device as claimed in claim 1, wherein the casing element is configured to encase the display device and/or the backlighting element.

3. The display device as claimed in claim 1, wherein the backlighting element comprises an optical filtering device and/or a light scattering device.

4. A method for manufacturing a backlighting element configured to backlight a display element, comprising:

forming the backlighting element at least partially from a transparent thermoplastic comprising polymethyl methacrylate, wherein the backlighting element comprises:

a light guide;

a casing element; and a reflective element comprising a non-transparent film, wherein the reflective element is disposed between the light guide and the casing element, or coupled to the casing element, such that the casing element is configured to reflect light emitted by the light guide in a direction of the display element; and wherein forming the backlighting element comprises an injection molding step comprising in-molding or over-molding the light guide from the polymethyl methacrylate with the reflective element present in a molding tool, and wherein the in-molding or over-molding comprises compression molding, injection molding, casting, blow molding, or extrusion of the polymethyl methacrylate to produce the backlighting element;

wherein the light guide and the casing element of the backlighting element are formed from the polymethyl methacrylate; and wherein forming the backlighting element comprises forming the light guide, the casing element, and the reflective element as a single integral part.

5. A method for manufacturing a display device, the display device comprising a display element, the display element comprising a liquid crystal display, and the liquid crystal display comprising thin film transistors, comprising:

assembling the display device with a single-piece backlighting element, wherein the single-piece backlighting element comprises a transparent thermoplastic, wherein the transparent thermoplastic comprises polymethyl methacrylate, and the single-piece backlighting element comprises:

a light guide;

a casing element; and a reflective element comprising a non-transparent film, wherein the reflective element is disposed between the light guide and the casing, or coupled to the casing element, such that the casing element is configured to reflect light emitted by the light guide in a direction of the display element;

forming the single-piece backlighting element by an injection molding step comprising in-molding or over-molding the light guide from the polymethyl methacrylate with the reflective element present in a molding tool, and wherein the in-molding or over-molding comprises compression molding, injection molding, casting, blow molding, or extrusion of the polymethyl methacrylate to produce the single-piece backlighting element;

wherein the light guide and the casing element of the single-piece backlighting element are formed from the polymethyl methacrylate; and wherein the light guide, the casing element, and the reflective element form a single integral part.

* * * * *